(12) United States Patent
Ohashi et al.

(10) Patent No.: US 8,585,960 B2
(45) Date of Patent: Nov. 19, 2013

(54) METHOD FOR PRODUCING SINTERED BODY, AND SINTERED BODY

(75) Inventors: Tsuneaki Ohashi, Nagoya (JP);
Masakatsu Inoue, Komaki (JP);
Toshiichi Ikami, Kounan (JP); Keiichiro Watanabe, Kasugai (JP); Kunihiko Yoshioka, Nagoya (JP); Kazuhi Matsumoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 882 days.

(21) Appl. No.: 12/283,726

(22) Filed: Sep. 15, 2008

(65) Prior Publication Data
US 2009/0029087 A1    Jan. 29, 2009

Related U.S. Application Data

(63) Continuation of application No. PCT/JP2007/057025, filed on Mar. 23, 2007.

(60) Provisional application No. 60/793,826, filed on Apr. 21, 2006.

(30) Foreign Application Priority Data

| Mar. 24, 2006 | (JP) | 2006-082676 |
| Jul. 19, 2006 | (JP) | 2006-197393 |
| Nov. 1, 2006 | (JP) | 2006-297706 |

(51) Int. Cl.
*C04B 37/00* (2006.01)

(52) U.S. Cl.
USPC .................................................. 264/621

(58) Field of Classification Search
USPC ........................................................ 264/621
See application file for complete search history.

(56) References Cited

U.S. PATENT DOCUMENTS

| 4,959,258 A * | 9/1990 | Yoshida et al. ............... 428/192 |
| 6,033,788 A | 3/2000 | Cawley et al. |
| 2002/0033565 A1 | 3/2002 | Hayashi |
| 2002/0117249 A1 | 8/2002 | Zaslavsky et al. |
| 2003/0176272 A1* | 9/2003 | Asano .......................... 501/127 |

(Continued)

FOREIGN PATENT DOCUMENTS

| JP | 09-320524 | 12/1997 |
| JP | 10-064481 | 3/1998 |

(Continued)

OTHER PUBLICATIONS

Machine translation of 2001-335371.*

(Continued)

*Primary Examiner* — Joseph S Del Sole
*Assistant Examiner* — Russell Kemmerle, III
(74) *Attorney, Agent, or Firm* — Burr & Brown

(57) ABSTRACT

A first inorganic powder molded body and a second inorganic powder molded body are obtained. Each of the bodies contains an inorganic powder, an organic dispersion medium having a reactive functional group and a gelling agent and is solidified by chemical reaction of the organic dispersion medium and the gelling agent. Slurry containing a powder component and an organic dispersion medium is applied to a joint surface of the first inorganic powder molded body. The inorganic powder molded bodies are allowed to abut on each other while interposing the slurry therebetween, and integrated together into a joined body. A sintered body is obtained by sintering the joined body.

19 Claims, 17 Drawing Sheets

(56) References Cited

U.S. PATENT DOCUMENTS

| | | |
|---|---|---|
| 2003/0209984 A1 | 11/2003 | Niimi |
| 2004/0138047 A1 | 7/2004 | Yamada et al. |
| 2005/0287319 A1 | 12/2005 | Miyazawa et al. |
| 2006/0214337 A1 | 9/2006 | Suzuki |
| 2007/0243415 A1* | 10/2007 | Yoshioka et al. ............ 428/701 |
| 2008/0122153 A1* | 5/2008 | Yoshioka et al. ............ 269/50 |

FOREIGN PATENT DOCUMENTS

| | | |
|---|---|---|
| JP | 2001-118543 | 4/2001 |
| JP | 2001-335371 A1 | 12/2001 |
| JP | 2003-128473 A1 | 5/2003 |
| JP | 2004-519820 A1 | 7/2004 |
| JP | 2004-220784 | 8/2004 |
| WO | WO 02/085590 A1 | 10/2002 |
| WO | 03-075312 A1 | 9/2003 |
| WO | WO 2005/028170 A1 | 3/2005 |
| WO | WO 2005/047211 | 5/2005 |

OTHER PUBLICATIONS

European Search Report, European Application No. 07740463.0, dated Feb. 17, 2012 (7 pages).

Japanese Office Action, Japanese Patent Application No. 2008-542525, dated Jan. 4, 2013 (4 pages).

* cited by examiner

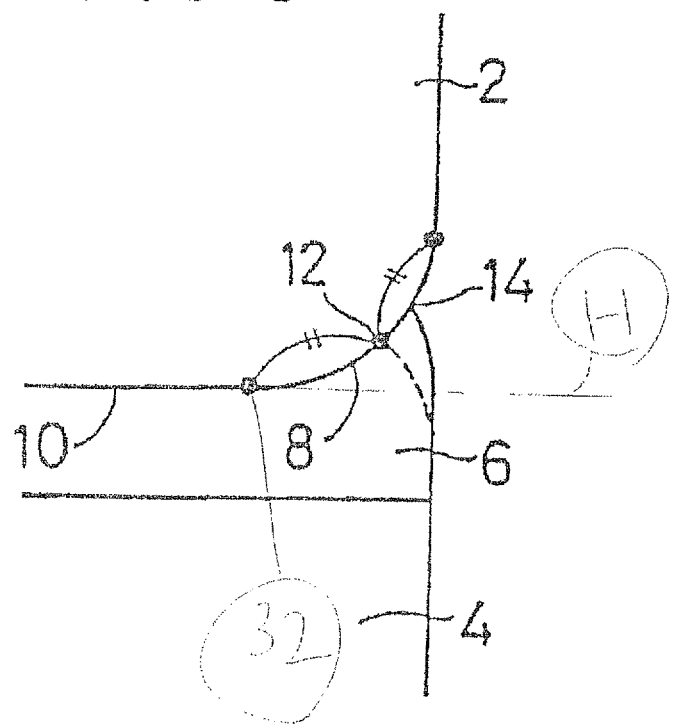

Fig. 6
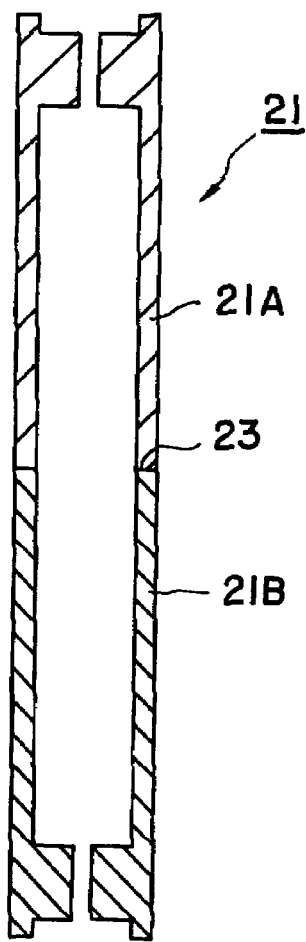
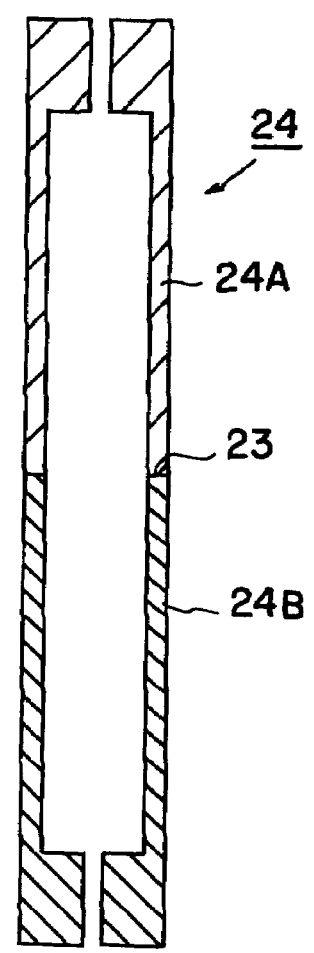

Fig.13
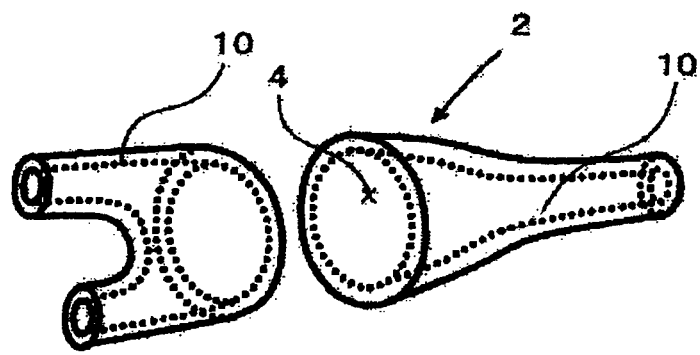
First half
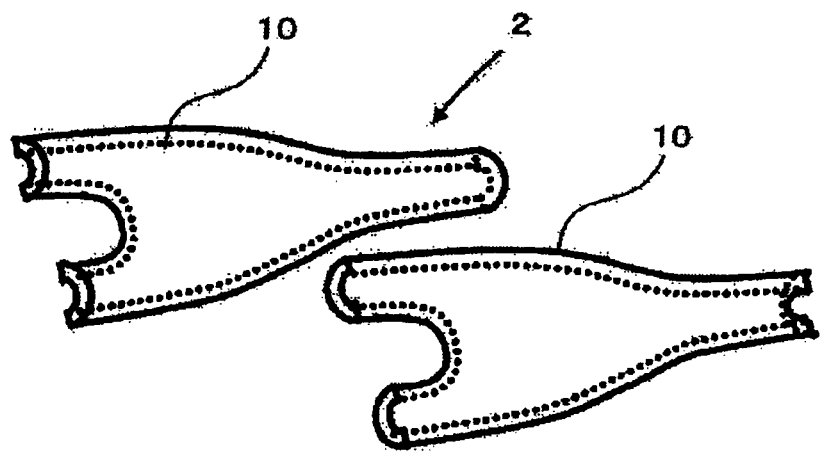
Second half

Fig.14
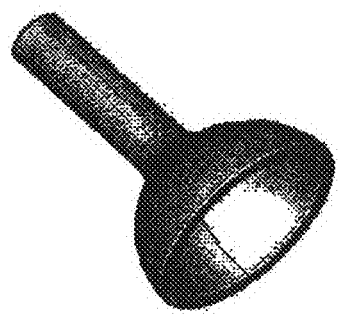
First half
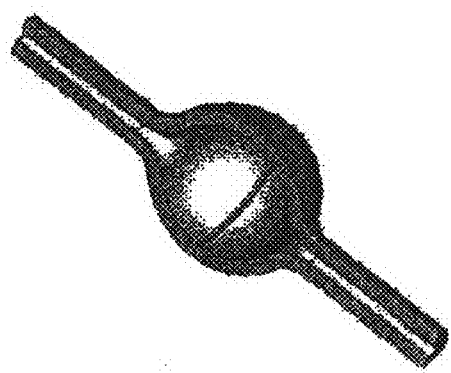
Second half
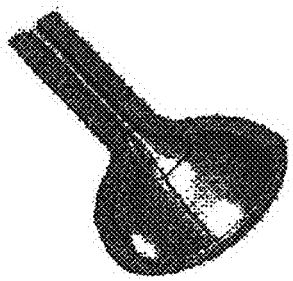
quarter
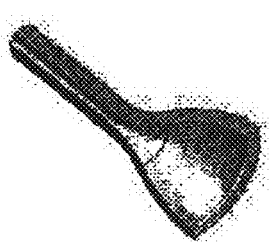
eighth

METHOD FOR PRODUCING SINTERED BODY, AND SINTERED BODY

FIELD OF THE INVENTION

The present invention relates to a sintered body obtained by integrating a plurality of inorganic powder molded bodies, and a method for producing the same.

BACKGROUND OF THE INVENTION

Since ceramics, high-melting point metals and ceramics/metal composites are generally produced by sintering raw material powders, shape assignment to product is performed mainly at the time of molding. However, the easiness of the shape assignment depends on molding method. For example, a disk product can be easily molded by mold pressing method. However, a product with complicated shape requires molding of a massy molded body by CIP (Cold Isostatic Press) before shape assignment by machining.

Gel cast molding is a method for obtaining an inorganic powder molded body by solidifying liquid slurry containing an inorganic powder by mutual chemical reaction of organic compounds contained in the slurry. This process is excellent in accurate shape assignment property because of accurate transferability of mold shape. However, in the case of a product having a closed structure, this process is not applicable because of the non-releasable shape, or requires separate providing of a core mold as in lost-wax process for assignment of inner surface shape.

Particularly, in a product having an end hole diameter smaller than a body part inside diameter such as a metal halide lamp light emitting tube or a high-pressure sodium lamp light emitting tube, it is difficult to improve the productivity. It is considerable to divide each element constituting the light emitting tube to simply-shaped small parts and obtain each small part by extrusion molding, dry back press molding, or mold press molding. In this case, a plurality of parts can be integrated at the time of sintering using the sintering shrinkage difference between them. Further, a method for obtaining a preliminarily integrated molded body by a gel cast molding comprising separately molding a core and injecting slurry between the core and an outer mold is also adopted (refer to Republished Patent Applications WO 2002-085590A1 and WO 2005-028170A1).

To separately mold a plurality of parts and join them to an integrated unit, a method described in Japanese Patent Publication No. 2004-519820 is further adoptable. In this joining method, an organic binder is included in each ceramic body, and the organic binder is locally melted by simultaneously heating a joint surface of a first ceramic body and a joint surface of a second ceramic body. The first and second joint surfaces are then brought into contact with each other through the locally melted binder, and compression and elongation are alternately provided to the boundary surface area between the two joint surfaces, whereby joining parts are integrated together.

SUMMARY OF THE INVENTION

However, the method of mutually fitting and sintering a plurality of separately molded parts into an integrated unit using the sintering shrinkage difference between the both requires complicated processes and can hardly improve the productivity. It is difficult for the gel cast molding described in Republished Patent Applications WO 2002-085590A1 and WO 2005-028170A1 to simultaneously attain high shape accuracy and high productivity.

In the method described in Japanese Patent Publication No. 2004-519820, the molded body is apt to deform at the time of joining or in degreasing process because of use of a soluble binder. Namely, in the joining technique by heating a joining area, it is substantially impossible to make only the joint interface into a buffer zone by heating, and several mm in the vicinity of the joining area deforms, developing a buffer effect. Consequently, the shape is easily changed. Further, the necessity of a process for compressing/elongating joint surfaces of two molded bodies increases the production cost. Particularly, in butt joining of thin parts of two molded bodies, the compression/elongation process of joint surfaces is extremely difficult to execute. Further, since the molded bodies to be joined are substantially formed by wax-based injection molding, a long time is required for degreasing, resulting in deterioration of productivity.

An object of the present invention is to provide a novel method for joining and sintering a plurality of inorganic powder molded bodies into a strong integrated unit.

The method for producing a sintered body according to the present invention comprises the steps of:

obtaining a first inorganic powder molded body and a second inorganic powder molded body, each of which comprises an inorganic powder, an organic dispersion medium having a reactive functional group and a gelling agent and is solidified by chemical reaction between the organic dispersion medium and the gelling agent;

applying a slurry comprising a powder component and an organic dispersion medium to a joint surface of the first inorganic powder molded body;

bringing the first inorganic powder molded body into contact with the second inorganic powder molded body while interposing the slurry between them to obtain an integrated joined body; and sintering the joined body to obtain a sintered body.

The present invention also relates to a sintered body produced by the above-mentioned method.

According to the present invention, a molded body of a type such that it is at least partially solidified by chemical reaction between organic dispersion medium and gelling agent is used, and a plurality of such molded bodies are butt-integrated through a slurry applied between joint surfaces thereof and sintered. A strongly joined sintered body can be thus obtained.

In the present invention, mutual action and reaction of the unreacted organic dispersion medium and the gelling agent in the slurry applied to the joint surface probably contributes to the joining of the joint surfaces. Since only the slurry part applied to the joint interface brings the buffer effect, the shapes of the respective molded bodies to be joined are easily kept. Accordingly, is consequently contributes to improvement in product shape accuracy as a joined sintered body. Although the applied slurry is left as a component of the finally sintered body, it was confirmed that the interface is microscopically integrated to provide a strong joint.

In the present invention, thus, suppression of deformation of the powder molded bodies to be joined and reduction in pores in the interface can be attained, and in application to a reaction vessel such as a light emitting tube, a joint substantially free from leak can be easily attained. In He leak test, for example, a value of less than $1\times10^{-7}$ atm·cm$^3$/sec could be ensured.

BRIEF DESCRIPTION OF THE DRAWINGS

FIGS. 6(a) and (b) are sectional views of a recessed type light emitting tube 21 and a semi-closed type light emitting tube 24, respectively;

FIG. 13 are perspective views exemplifying typical split bodies of a sintered body;

FIG. 14 are perspective views exemplifying typical split bodies of a sintered body;

DETAILED DESCRIPTION OF THE INVENTION

Figure 1:
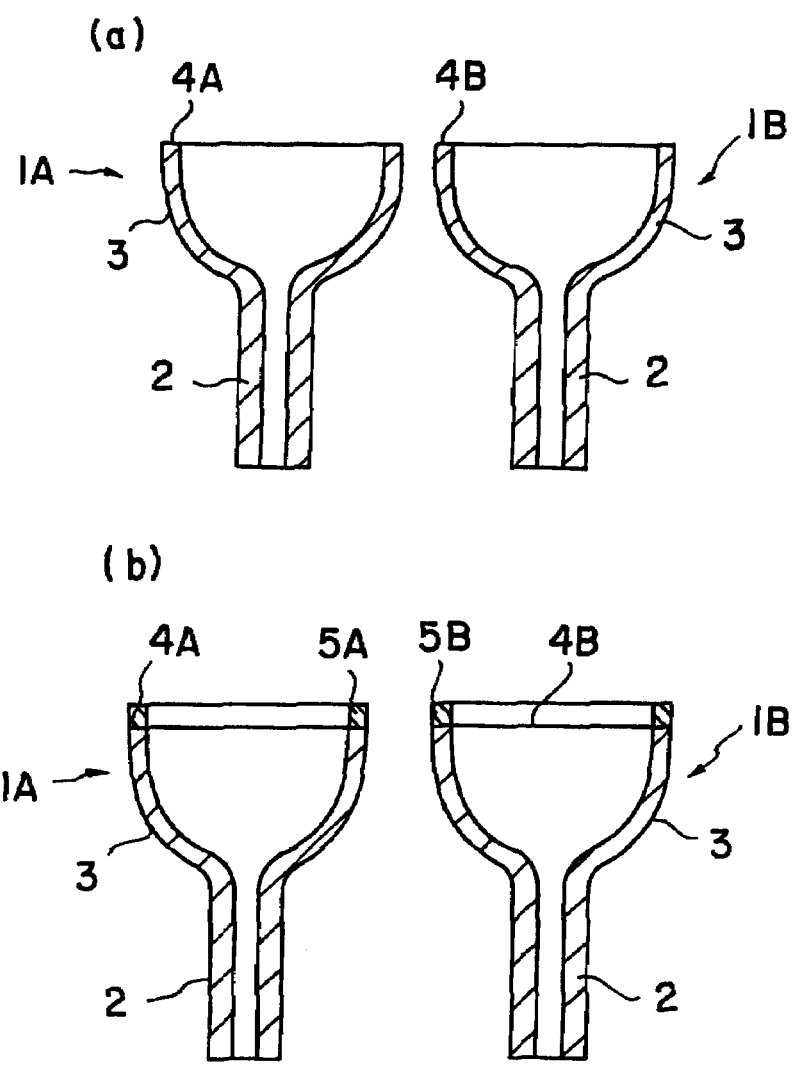
FIGS. 1(a) and (b) are sectional views of inorganic powder molded bodies 1A and 1B usable in an embodiment of the present invention, in which (b) shows the state where slurry is applied to the joint surface of each molded body.

In a preferred embodiment of the present invention, the joint surface of the first inorganic powder molded body is horizontally arranged, substantially perpendicular to the vertically arranged central axis of the first inorganic powder molded body. In a further preferred embodiment, the joining is performed with the application of a load in a direction substantially perpendicular to the joint surface in a stage where the first inorganic powder molded body is brought into contact with the second inorganic powder molded body.

In a preferred embodiment, the slurry is applied also to the joint surface of the second inorganic powder molded body.

The present invention will be described in more detail in appropriate reference to the drawings.

As shown in FIG. 1(a), for example, a pair of inorganic powder molded bodies 1A and 1B is prepared. Each molded body 1A, 1B consists of a capillary tube part 2 and a body part 3. Each molded body is formed by, for example, gel cast molding described later.

Slurry 4A is applied to at least a joint surface 4A of the first molded body 1A as shown in FIG. 1(b). Preferably, slurry 5B is applied also to a joint surface 4B of the second molded body 1B. The joint surfaces of the molded bodies are allowed to abut on each other, as shown in FIG. 2(a), to form a joined body 6. At this time, a pressure is preferably applied toward the arrowed direction A. The pressurizing direction A is substantially perpendicular to the joint surface 4A. The thus-obtained integrated molded body 6 is sintered, whereby a sintered body 7 shown in FIG. 2(b) is obtained. The molded body 6 may be calcined and degreased prior to the sintering.

The resulting sintered body 7 consists of halves 8A and 8B and a joint part 9. The joint part 9 is, in general, microstructurally continued to the halves 8A and 8B. For example, in the photographic image of FIG. 3 in which the upper half corresponds to the joint part 9, and the lower half to a molded body part (half), no microstructural interface is observed between the both.

As shown in FIG. 4(a), for example, one body part molded body 11 and two capillary tube part molded bodies 13A and 13B are prepared. Connection parts 12 with smaller diameters are formed at both ends of the body part molded body 11. Each of the molded bodies is formed by, for example, the gel cast molding described later.

Slurries 15A and 15B are applied to at least joint surfaces 14 of the first capillary tube molded bodies 13A and 13B as shown in FIG. 4(b). The slurries are preferably applied also to joint surfaces of the second body part molded body 11. The respective joint surfaces of the molded bodies are allowed to abut on each other, as shown in FIG. 5(a), to form a joined body 16. At this time, a pressure is preferably applied in an arrowed direction A. This pressurizing direction A is substantially perpendicular to the joint surfaces 14. The thus-obtained integrated molded body 16 is sintered, whereby a sintered body 17 shown in FIG. 5(b) is obtained. The molded body 16 may be calcined and decreased prior to sintering.

The resulting sintered body 17 consists of a body part 11 and a pair of capillary tube parts 13A and 13B. Generally, the joint part 9 is microstructurally continued thereto.

The sintered body according to the present invention is suitably applicable to a light emitting tube for a discharge lamp. A high-pressure discharge lamp is applicable to various lighting systems for as automotive headlamp, OHP (overhead projector) and liquid crystal projector and the like. Such light emitting tubes include a metal halide lamp light emitting tube and a high-pressure sodium lamp light emitting tube. The sintered body of the present invention is applicable to, without limitation to the above use, various uses needing thermal impact resistance such as a structure in a heat cycle engine, a visual observation window for high-temperature furnace and the like.

Figure 7:
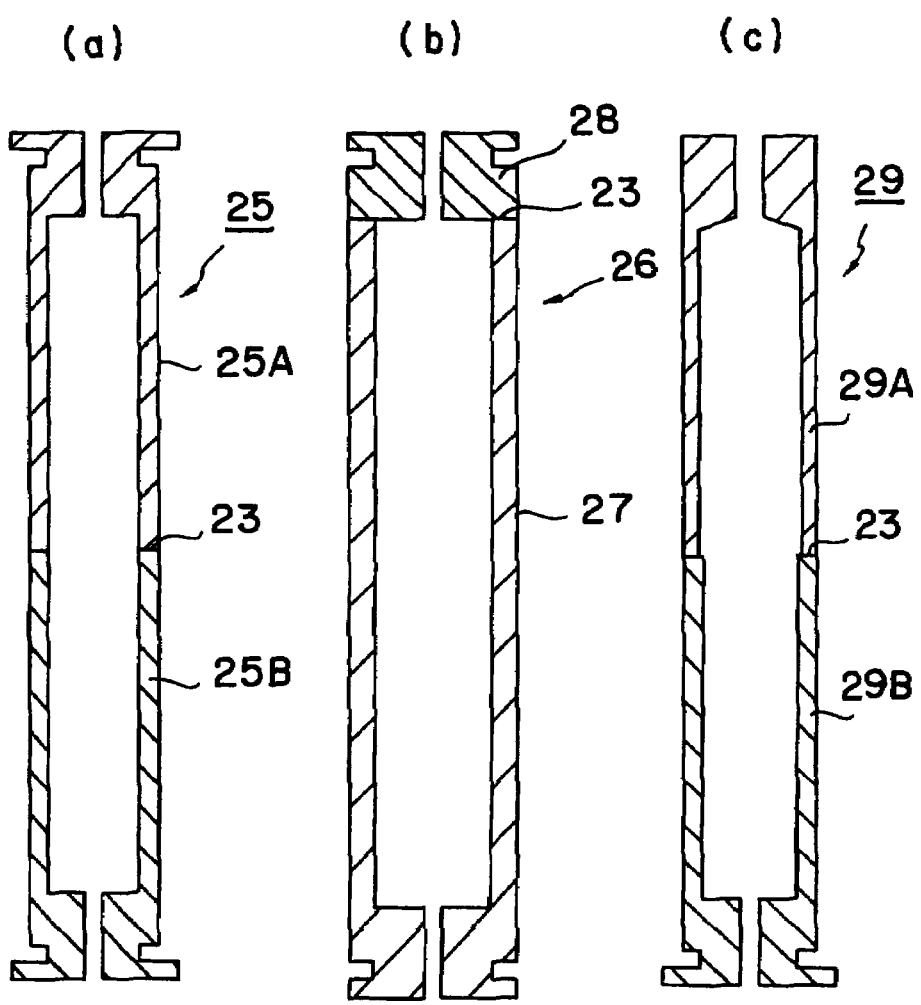
FIGS. 7(a), (b) and (c) are sectional views of a top hat type light emitting tube 25, another top hat type light emitting tube 26, a monolithic top hat type light emitting tube 29, respectively.

FIGS. 6 and 7 are sectional views showing the forms of various light emitting tubes for high-pressure sodium discharge lamp.

A light emitting tube 21 of FIG. 6(a) which is of a so-called recessed type consists of halves 21A and 21B. Denoted at 23 is a joint interface.

A light emitting tube 24 of FIG. 6(b) which is of a so-called semi-closed type consists of halves 24A and 24B. Denoted at 23 is a joint interface.

A light emitting tube 25 of FIG. 7(a) which is of a so-called top hat type consists of halves 25A and 25B. Denoted at 23 is a joint interface.

The light emitting tube 28 of FIG. 7(b) which is of a so-called top hat type consists of a main body 27 and an end portion 28 bonded to one end of the main body 27. Denoted at 23 is a joint interface.

A light emitting tube 29 of FIG. 7(c) which is of a so-called monolithic top hat type consists of halves 29A and 29B. Denoted at 23 is a joint interface.

In the present invention, the first and second inorganic power molded bodies are obtained by casting slurry containing an inorganic powder and an organic compound in a molding mold, and solidifying it by chemical reaction between the organic compounds, for example, chemical reaction between dispersion medium and gelling agent or between gelling agents, followed by releasing. This molding slurry contains, in addition to raw material powder, a dispersion medium and a gelling agent, and may further contain a dispersant for adjustment of viscosity or solidification reaction, and a catalyst. Such a molding method is described in Republished Patent Applications WO 2002-085590A1 and WO 2005-028170A1.

The inorganic powders contained in the first inorganic powder molded body and the second inorganic powder molded body and the powder component contained in the slurry applied to the joint surfaces are not particularly limited, and ceramic powder, metallic powder, and a mixture of ceramic powder and metal powder can be used. Concrete examples are as follows.

Examples of the ceramic powder include alumina, aluminum nitride, zirconia, YAG and the mixtures thereof, and a powder with high purity of 99% or more is preferably used. The raw material powder can contain an additive component for improving sintering property or characteristics. Examples thereof include Mg, Y, Zr, Sc, La, Si, B, Na, Cu, Fe, Ca or the oxides thereof. Examples of the metallic powder include molybdenum, tungsten and the alloys thereof.

As a sintering aid added to the ceramic powder, magnesium oxide is preferably used, but $ZrO_2$, $Y_2O_3$, $La_2O_3$, and $Sc_2O_3$ are also suitable.

An organic dispersion medium, which is contained in the slurry to be applied to the joint surface, may or may not have a reactive functional group. However, this organic dispersion medium particularly preferably has a reactively functional group.

The organic dispersion medium having a reactive functional group to be contained in the first and second inorganic powder molded bodies and the organic dispersion medium having a reactive functional group to be contained in the slurry applied to the joint surface can be exemplified as follows.

The organic dispersion medium having a reactive functional group is required to satisfy two conditions: it is a liquid material which can solidify the slurry by chemical bonding with the gelling agent and that it is a liquid material which can form highly fluidized slurry easy to cast. Namely, for solidification of the slurry by chemical bonding with the gelling agent, the dispersion medium must have a reactive functional group capable of forming a chemical bond with the gelling agent, such as hydroxyl group, carboxyl group or amino group in the molecule.

Although a material having at least one reactive functional group suffices for the organic dispersion medium, use of an organic dispersion medium having two or more reactive functional groups is preferred for ensuring a further sufficient solidified state.

As a liquid material having two or more reactive functional groups, for example, polyhydric alcohol (diols such as ethylene glycol, triols such as glycerin, etc.) and polybasic acid (dicarboxylic acid, etc.) are considerable. The reactive functional groups in the molecule don't have to be of the same kind, but may be different from each other. The liquid material may have a number of reactive functional groups, as polyethylene glycol.

Use of a liquid material having viscosity as low as possible is preferred for formation of the highly fluidized slurry easy to cast, and a material having a viscosity at 20° C. of 20 cps or less is preferably used.

The above-described polyhydric alcohol or polybasic acid may be undesirable as the reactive dispersion medium even if it can solidify the slurry, because of viscosity increased by formation of hydrogen bond. Therefore, esters having two or more ester groups such as polybasic acid ester (e.g., dimethyl glutarate) and acid esters of polyhydric alcohol (e.g., triacetylene) are desirably used as the organic dispersion medium. Use of the polyhydric alcohol or polybasic acid in an amount as low as it will not largely thicken the slurry is also effective for improving the strength.

The esters satisfy the above-mentioned two conditions because they are relatively stable, but can sufficiently react with a gelling agent having high reactivity and have low viscosity. Particularly, an ester having a total number of carbons of 20 or less is suitably usable as the reactive dispersion medium because of low viscosity.

Concrete examples of the organic dispersion medium having the reactive functional group, which can be contained in the raw material of the inorganic powder molded bodies and the slurry to be applied to the joint surface, include ester-based nonionic system, alcohol ethylene oxide, amine condensate, nonionic special amide compound, modified polyester compound, carboxyl group-containing polymer, maleic polyanion, polycarboxylate, multi-chain high-molecular nonionic system, phosphate, sorbitan fatty acid ester, sodium alkylbenzene sulfonate, and maleic acid compound. In addition, those described in lines 10-25 of page 22 of WO 2002-085590A1 can be given.

Examples of non-reactive dispersion medium include hydrocarbon, ether, toluene and the like.

The gelling agent contained in the inorganic powder molded body and the gelling agent which can be contained in the slurry applied to the joint surface causes solidification reaction by reaction with the reactive functional groups contained in the dispersion medium, and can be exemplified as follows in addition to description in page 21 to line 9 of page 22 in WO 2002-085590A1.

The viscosity at 20° C. of the gelling agent is preferably 3000 cps or less. Specifically, the slurry is preferably solidified by chemical bonding of an organic dispersion medium having two or more ester groups with a gelling agent having isocyanate group and/or isothiocyanate group.

This reactive gelling agent is specifically a material which can solidify the slurry by chemical bonding with the dispersion medium. Accordingly, the gelling agent can be any material having a reactive functional group in the molecule chemically reactive with the dispersion medium, for example, any one of monomer, oligomer and prepolymer which is three-dimensionally cross-linked by addition of crosslinking agent (e.g., polyvinyl alcohol, epoxy resin, phenolic resin, etc.).

However, as the reactive gelling agent, a material having a low viscosity, concretely, viscosity at 20° C. of 3000 cps or less is preferably used from the point of ensuring the fluidity of the slurry.

Since prepolymers and polymers having large average molecular weights are generally high in viscosity, a one smaller in molecular weight than these polymers, specifically, a monomer or an oligomer having an average molecular weight (by GPC method) of 2000 or less is preferably used in the present invention. The "viscosity" referred to herein means the viscosity of the gelling agent itself (viscosity in 100% gelling agent), not the viscosity of a commercially available gelling agent diluted solution (e.g., an aqueous solution of gelling agent).

Preferably, the reactive functional group in the gelling agent is appropriately selected, considering the reactivity with the reactive dispersion medium. In use of an ester with relatively low reactivity as the reactive dispersion medium, for example, a gelling agent having highly reactive isocyanate group (—N=C=O) and/or isothiocyanate group (—N=C=S) is preferably selected.

Although isocyanates are generally reacted with diols or diamines, the diols mostly have high viscosities as described above, while the diamines are so reactive that the slurry may be solidified before casting.

From such a viewpoint, it is preferable to solidify the slurry by the reaction of the reactive dispersion medium consisting of ester with the gelling agent having isocyanate group and/or isothiocyanate group. For ensuring a further sufficient solidified state, it is preferable to solidify the slurry by the reaction of the reactive dispersion medium having two or more ester groups with the gelling agent having isocyanate group and/or isothiocyanate group. Use of the diols and diamines in an amount as low as it will not largely thicken the slurry is also effective for improving the strength.

Examples of the gelling agent having isocyanate group and/or isothiocyanate group include MDI (4,4'-diphenylmethane diisocyanate)-based isocyanate (resin), HDI (hexamethylene diisocyanate)-based isocyanate (resin), TDI (tolylene diisocyanate)-based isocyanate (resin), IPDI (isophorone diisocyanate)-based isocyanate (resin), and isothiocyanate (resin).

Considering chemical characteristics such as solubility with the reactive dispersion medium, another functional group is preferably introduced to the basic chemical structure. For example, in reaction with the reactive dispersion medium consisting of ester, introduction of hydrophilic functional group is preferred from the point of improvement in homogeneity in mixing by increasing solubility with ester.

The gelling agent may contain a reactive functional group except isocyanate or isothiocyanate group in the molecule, or may contain both the isocyanate group and the isothiocyanate group. Further, it may include a number of reactive functional groups in the molecule as polyisocyanate.

To the materials of the first and second inorganic powder molded bodies and the slurry applied to the joint surface, various additives such as anti-foaming agent, surfactant, sintering aid, catalyst, and characteristic improver can be added in addition to the above-mentioned components.

The slurry applied to the joint surfaces may further contain a catalyst for promoting the solidification. The molding slurry and the joining slurry are preferably of the same kind and particularly preferably identical.

The slurry for producing the first and second inorganic powder molded bodies and the slurry to be applied to the joint surface can be prepared as follows.

(1) Slurry is prepared by dispersing an inorganic powder in a dispersion medium, and then adding a gelling agent thereto.

(2) Slurry is prepared by simultaneously adding and dispersing an inorganic powder and a gelling agent into a dispersion medium.

Considering the workability in casting and application, the slurry has viscosity at 20° C. of preferably 30000 cps or less, further preferably 20000 cps or less. The viscosity of the slurry can be adjusted by the kind of powder, the amount of dispersant, or slurry concentration (volume % of powder to the whole volume of slurry) as well as the above-mentioned viscosities of the reactive dispersion medium and gelling agent.

In general, the slurry has a concentration of preferably 25-75 vol %, more preferably 35-75 vol %, considering minimization of cracks during drying shrinkage.

At the time of joining, the reaction of organic compounds in each inorganic powder molded body is preferably progressed enough to ensure a strength sufficient for handling the molded body. However, the reaction may not be completed, whereby progress of the solidification reaction in the joining part is facilitated. From this point of view, the strength of each inorganic powder molded body just before joining is preferably 2 kPa to 5 MPa.

The centerline average surface roughness Ra of each joint surface in each inorganic powder molded body is set preferably within the range of 1 micron to 100 microns. The surface roughness measurement is principally performed using a surface roughness meter. If a molded body is difficult to measure because of low strength, irregularities of the surface can be microscopically observed. Each joint end surface can be subjected to application of slurry as it has a molded mold surface, or the joint surface is preferably smoothed with an abrasive plate or grinding wheel prior to the application of slurry.

The application amount of the joining slurry is set to preferably 10 microns to 1 mm in terms of the thickness of application layer. Relatively thick application of the joining slurry increases the buffer effect, and in a metal halide lamp light emitting tube, for example, concentricity between capillaries and dimensional accuracy in vertical length to joint surface, total length or body part length can be easily ensured.

It is also preferable to penetrate a part of the joining slurry into the powder molded body after the application. The penetration depth is preferably 5 to 500 microns.

The application method of the slurry to the joint surface of the inorganic powder molded body is not particularly limited, and a general dispenser can be used.

In a preferred embodiment, the joining slurry is non-self-hardenable slurry which is not solidified by chemical reaction. In this case, examples of a non-reactive dispersion medium to be contained in the slurry include xylene, ether, butyl Carbitol, butyl Carbitol acetate, terpineol, and 2-ethylhexanol. Various binders such as polyvinyl acetal resin (e.g., trade names "BM-2", "BM-S" and "BL-S", each of which is manufactured by SEKISUI CHEMICAL) and ethyl cellulose (e.g., trade name "ETHOCEL") can be used. A dispersant such as DOP (bis(2-ethylhexyl)phthalate) or an organic solvent such as acetone or isopropanol for viscosity adjustment in mixing can be also properly used.

Such non-self-hardenable joining slurry can be obtained by mixing raw material powder, solvent and binder by a general production method of ceramic paste or slurry using triroll mill, pot mill or the like. Dispersant or inorganic solvent can be properly mixed thereto. The viscosity at 20° C. of the joining slurry is preferably 500000 cps or less. In this range, the supply thickness of the joining slurry can be increased while keeping surface tension suitable for formation of the joining slurry layer. The viscosity is more preferably 300000 cps or less. In this range, the supply shape of the joining slurry can be cleared. The viscosity of the slurry can be adjusted depending on the amount of the dispersion medium, dispersant or organic solvent or the slurry concentration (weight % of powder to the total volume of slurry. The concentration will hereinafter be shown by wt %). The slurry concentration is generally preferably 25 to 90 wt %, further preferably 35 to 90 wt % from the viewpoint of minimization of cracks during drying shrinkage.

A known means such as dispenser can be used to supply the joining slurry between joint surfaces of inorganic powder molded bodies. A printing means such as screen printing or metal mask printing can be used, as well as known liquid supply means such as dispenser, dipping or spraying, to supply the molding slurry to joint surfaces of inorganic powder molded bodies. The supplied joining slurry is crushed between the molded bodies in bonding process to form a joint part of a joined body. According to the screen printing, an accurate joining slurry layer and joint part can be consequently obtained since the joining slurry can be supplied to the joint surfaces with accurate control of thickness or pattern. According to the metal mask printing, shape control of a molding slurry layer and a joint part is facilitated since the joining slurry can be easily supplied with sufficient thickness to the joining surface.

When the thickness of the joining slurry layer supplied onto the joint surface of the inorganic powder molded body is 200 μm or less (preferably 10 μm or more), it is preferred to supply the joining slurry by screen printing. According to screen printing, the joining slurry can be accurately supplied with a uniform thickness, and a joining slurry layer with uniform width or thickness and thus an accurately controlled joint part can be consequently obtained. When the thickness of the joining slurry layer supplied onto the joint surface of the inorganic powder molded body is 500 μm or less (preferably 200 μm or more), an accurate joining slurry pattern can be formed on the joint surface by using metal mask printing. Consequently, a satisfactory joint part can be obtained. When the thickness of the joining slurry layer supplied onto the joint surface of the inorganic powder molded body is 500 μm or more (preferably 1000 μm or less), the metal mask printing is preferably used. According to the metal mask printing, a thickened slurry layer can be easily formed, and the dispersion of thickness can be also moderated by controlling the distance between inorganic powder molded bodies.

In adoption of known liquid supply means or printing means such as screen printing or metal mask printing, the conditions can be appropriately set according to the viscosity, supply thickness or the like of the joining slurry to be applied.

The joining slurry may be supplied between surfaces to be joined (joint surfaces) of two inorganic powder-containing molded bodies while mutually opposing the joint surfaces, or supplied onto the joint surface(s) of one or both of the inorganic powder molded bodies.

The inorganic powder molded bodies can be brought into contact with each other while applying a load in the direction A substantially perpendicular to the joint surfaces, or while applying only the dead weight. The load is not particularly limited, but it is preferably set to not less than 0.01 kgf/cm$^2$ for enhancing the strength of the joint part and also to not more than 5 kgf/cm$^2$ from the point of ensuring the dimensional accuracy of each molded body.

In a preferred embodiment, an expansion part is provided on at least the outside of the joining end part of the first inorganic powder molded body. This embodiment will be described.

The joining slurry supplied to the joint surface tends to protrude out of the joint surface at the time of application of a load in joining. The protrusion of the slurry with irregular amount or protrusion shape causes deterioration of commercial value, and increase in evaporation amount of the sintering aid in the protrusion part may cause reduction in strength or grain growth. Therefore, prevention of the protrusion of the joining slurry or ensuring of a sound protrusion shape preventing strength reduction or grain growth is requested.

It is conceivable that the joining slurry is matched to the shape of the molded body while suppressing the protrusion of the slurry by chamfering the edge of the joint surface of the molded body. However, according to experiments by the present inventors, it was difficult to have balance with the application amount of slurry or the wettability to molded body surface of slurry, with a tendency to generate clearance or pores in the joint interface. Further, in the method for suppressing the protrusion of slurry by chamfering the joint surface edge, the creeping distance of slurry in the joint part is shortened by the length of the chamfered part. This method is not suitable for an application requiring the function as a corrosion resisting container such as light emitting tube, because the life depends on the creeping distance of joining material.

By applying the joining slurry to a smaller area than the area of the joint surface by providing the expansion part on the outside of the joining end part of the molded body, the creeping distance of joining material can be ensured while suppressing the protrusion.

In a preferred embodiment, the expansion part is provided on at least the outside of the joining end part of the second inorganic powder molded body.

A recessed part or an expansion part may be provided on the inside of the joining end part(s) of the first inorganic powder molded body and/or the second inorganic powder molded body.

The joint surface may be flat. In a preferred embodiment, the joint surface of the first inorganic powder molded body is at least partially protruded. Further preferably, the joint surface of the second inorganic powder molded body is also at least partially protruded. This includes that a protrusion is formed in a part of the joint surface in addition to that the joint surface is entirely protruded.

When a load is applied at the time of joining, the joining slurry is pushed out in parallel to the joint surface. At that time, defoaming by vacuuming or the like is needed because the soundness of joint is deteriorated if bubbles are left. Bubbles are easily discharged out by protruding the joint surface. The protrusion may have a smoothly curved shape, a one-step or two-step or more rectangular shape or a wedge shape in a sectional view.

The expansion part may be isotropically extended outwardly or anisotropically provided when the molded body has a columnar shape or cylindrical shape.

When a closed space such as a cylindrical or hemispherical space is formed, an inner mold or core mold is difficult to release. When the joining slurry is protruded inwardly, the joining slurry is spread along the inner wall surface of the molded body by compression force generated in the circumferential direction because the circumferential length is minimized, and hardly protruded. Therefore, no expansion part may be provided on the inside of the molded body.

Further, a rounded part is preferably provided at the edge of the joint surface of the molded body to suppress excessive protrusion and to help the joining material to spread along a joining element. The rounded part may be a chamfered part, a circular surface, C-surface, or R-surface.

Figure 8:
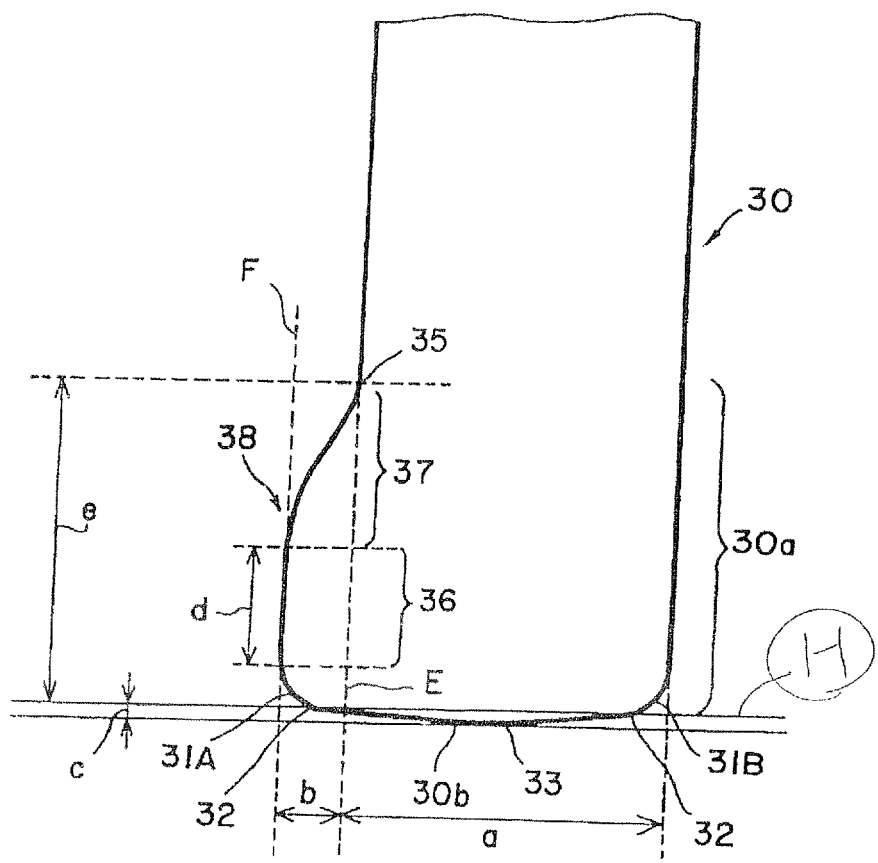
FIG. 8 is an enlarged view of the vicinity of a joining end part of a molded body 30.

This embodiment will be further described in reference to FIG. 8.

An expansion part 38 is provided on the outside (the left side in FIG. 8) of a joining end part 30a of a molded body 30. The molded body 30 has a shape capable of forming a closed space on the inside after joining. A protruding part 33 is formed on a joint surface 30b. Namely, chamfered parts 31A and 31B are formed at the edge of the joint surface 30b, and the protruding part 33 is protruded from a virtual surface connecting terminals 32 of the chamfered parts 31A and 31B.

On the outside surface of the joining end part 30a, extension of width is started from an expansion start point 35 toward the joint surface, and an inclined part 37 is gradually increased in width. A constant-width part 36 with fixed width is formed from the terminal of the inclined part 37. The joint surface-side terminal of the constant-width part 36 is connected to the joint surface 30b through the chamfered part 31A. In this example, a straight part having no protrusion is extended from the inside chamfered part 31B.

Figure 9:
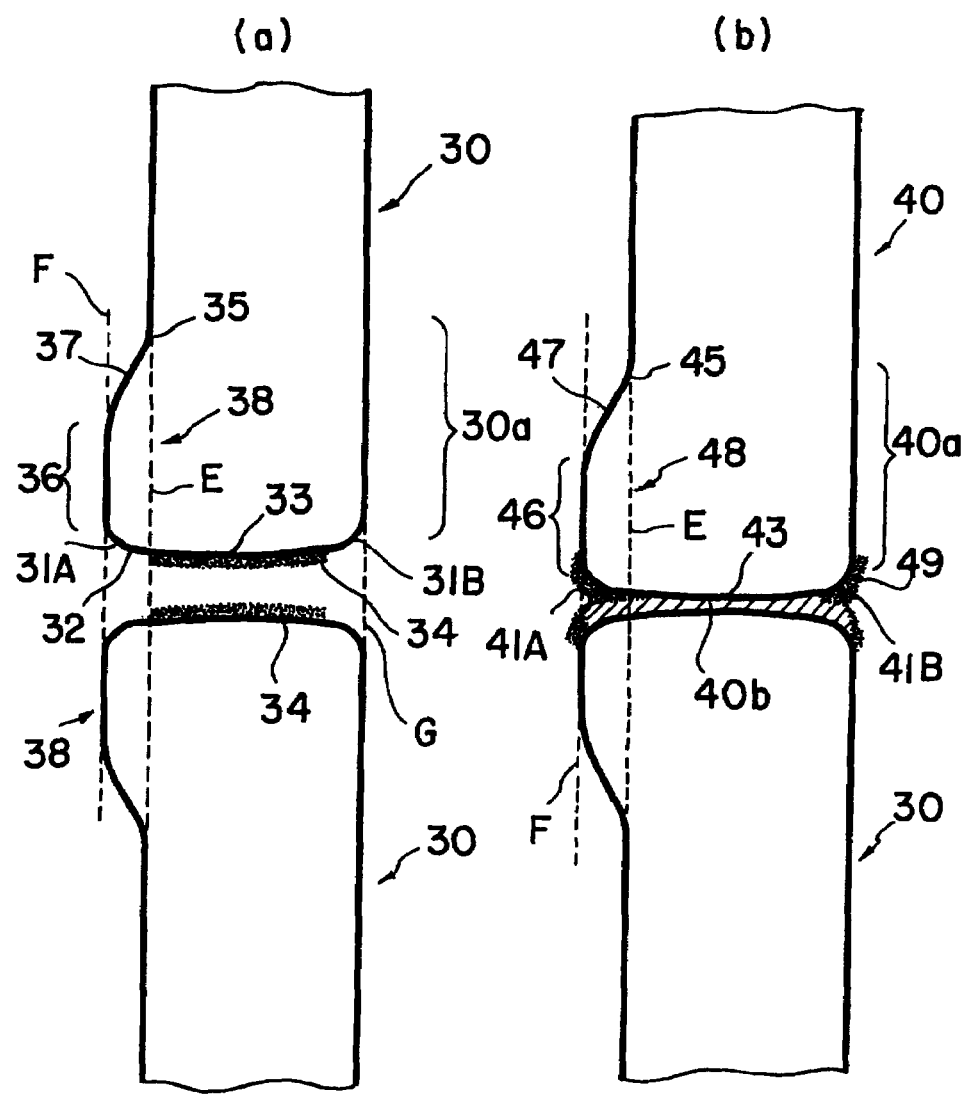
FIGS. 9(a) and (b) are schematic sectional views of the molded body 30, in which (a) shows the state before joining, and (b) shows the state after joining.

As shown in FIG. 9(a), two molded bodies 30 of FIG. 8 are opposed to each other. The joining slurry is interposed between two joint surfaces 30a as described above. Slurry 34 is applied onto each joint surface, for example, as shown in FIG. 9(a). The two molded bodies are integrally sintered and joined as shown in FIG. 9(b). Consequently, a sintered body 40 is formed with joining. The shape of the sintered body 40 is substantially the same as that of the molded bodies. An expansion part 48 is provided on the outside (the left side in FIG. 9) of an end part 40a of the sintered body 40. A closed space is formed on the inside of the sintered body 40. A protruding part 43 is formed on a joint surface 40b.

On the outside surface of the joining end part 40a, extension of width starts from an expansion start point 45 toward the joint surface, and an inclined part 47 is gradually increased in width. A constant-width part 46 with fixed width is formed from the terminal of the inclined part 47. The joint surface-side terminal of the constant width part 46 is connected to the joint surface 40b through a chamfered part 41A. In this example, a wall surface having no protrusion is extended from an inside chamfered part 41B. A joining material 49 may be slightly protruded to the inside and to the outside.

Figure 10:
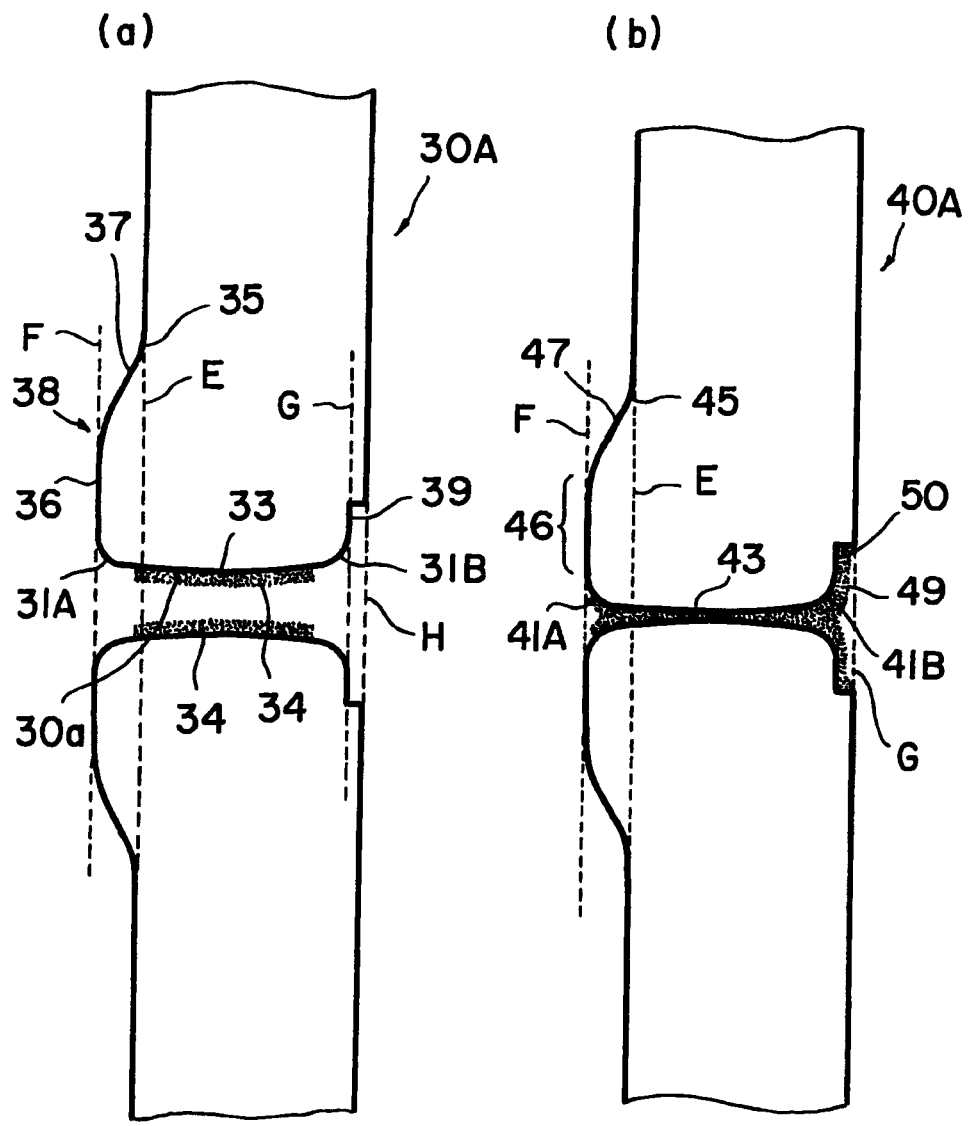
FIGS. 10(a) and (b) are schematic sectional views of a molded body 30A, in which (a) shows the state before joining, and (b) shows the state after joining.

In the example of FIGS. 10 (a) and (b), the same reference numbers are assigned to the same parts as in FIGS. 8 and 9 to omit the descriptions therefor. A molded body 30A of FIG. 10(a) comprises a recessed part 39 formed on the inside of the molded body and a chamfered part 31B is formed at the terminal of the recessed part 39. Slurry 38A, 38B is applied onto the joint surface 30a of each molded body 30A, and both of the molded bodies are joined and integrated together as shown in FIG. 10(b). A recessed part 50 is formed on the inside of a sintered body 40A of FIG. 10(b), and a joining material 49 is spread also into the recessed part 50.

In a molded body 30B of FIG. 11(a), an expansion part 58 is formed also on the inside of the molded body. On the inside of the joining end part 30a, extension of width is started from an expansion start point 55 toward the joint surface, and an inclined part 57 is gradually increased in width. A constant-width part 56 with fixed width is formed from the terminal of the inclined part 57. The joint surface-side terminal of the constant-width part 56 is connected to the joint surface 30b through a chamfered part 31A.

As shown in FIG. 11(b), two molded bodies 30B of FIG. 11(a) are opposed to each other. Joining slurry is interposed as described above between two joint surfaces 30a. The two molded bodies are integrally sintered and joined as shown in FIG. 11(b). Consequently, a sintered body 40B is formed with joining.

The sintered body 40B comprises an expansion part 68 on the inside of an end part 40a. On the inside surface of the joining end part 40a, extension of width is started from an expansion start point 65 toward the joint surface, and an inclined part 67 is gradually increased in width. A constant-width part 66 with fixed width is formed from the terminal of the inclined part 67. The joint surface-side terminal of the constant-width part 66 is connected to the joint surface 40b through a chamfered part 41A.

Each of outside (and inside) expansion parts in the first molded body and the second molded body further preferably satisfies the following requirements:

(b/a)

In FIG. 8, denoted at "a" is the molded body width at the terminal (expansion start point 35) of the joining end part 30a. "b" is the difference between a maximum width in the joining end part 30a and "a", which corresponds to the maximum width of the expansion part 38. "b/a" is a numerical value showing the ratio of protrusion in the expansion part. From the viewpoint of the present invention, b/a is set preferably to 0.05 or more, further preferably to 0.1 or more. The expansion start point 35 is susceptible to cracks in joining treatment if b/a is too large. From this viewpoint, b/a is set preferably to 0.4 or less, further preferably to 0.3 or less. This requirement is applicable to the inside and outside expansion parts.

(e/a)

"e" is the length of the expansion part 38, and "e/a" is an index showing the slenderness of the expansion part. If e/a is excessively large, the joint surfaces are susceptible to cracks at the time of joining or at the time of sintering. From this viewpoint, e/a is set to preferably 2 or less, further preferably to 1.5 or less. Further, since the expansion start point 35 is susceptible to cracks at the time of joining if e/a is excessively small, e/a is set preferably to 0.2 or more, further preferably to 0.5 or more. This requirement is applicable to the inside and outside expansion parts.

(d/a)

"d" is the length of the constant-width part 36 with fixed width of the expansion part. The constant-width part can be omitted although it can be provided. When the constant-width part 36 is provided, "d/a" is set preferably to 0.5 or less.

(c/a)

"c" is the height of the protruding part 33. The protruding part 33 is provided on the joint surface 30a, whereby the joining slurry is easily spread to the outside surface and to the inside surface to facilitate extension of the creeping distance of the joining material. From this point of view, "c/a" is set preferably to 0.01 or more, further preferably to 0.02 or more. Since the joining slurry becomes reversely difficult to spread if c/a is excessively large, c/a is set preferably to 0.5 or less, further preferably to 0.15 or less.

The expansion start point 35 can have an acute angle, but preferably constitutes a curved surface from the viewpoint of suppressing cracks. The curvature radius R of the expansion start point in a sectional view is set preferably to 0.05 to 2.0 mm. A constant-width part with fixed width may be provided between the expansion start point 35 and the extension completion part. This requirement is applicable to the inside and outside expansion parts.

Figure 11:
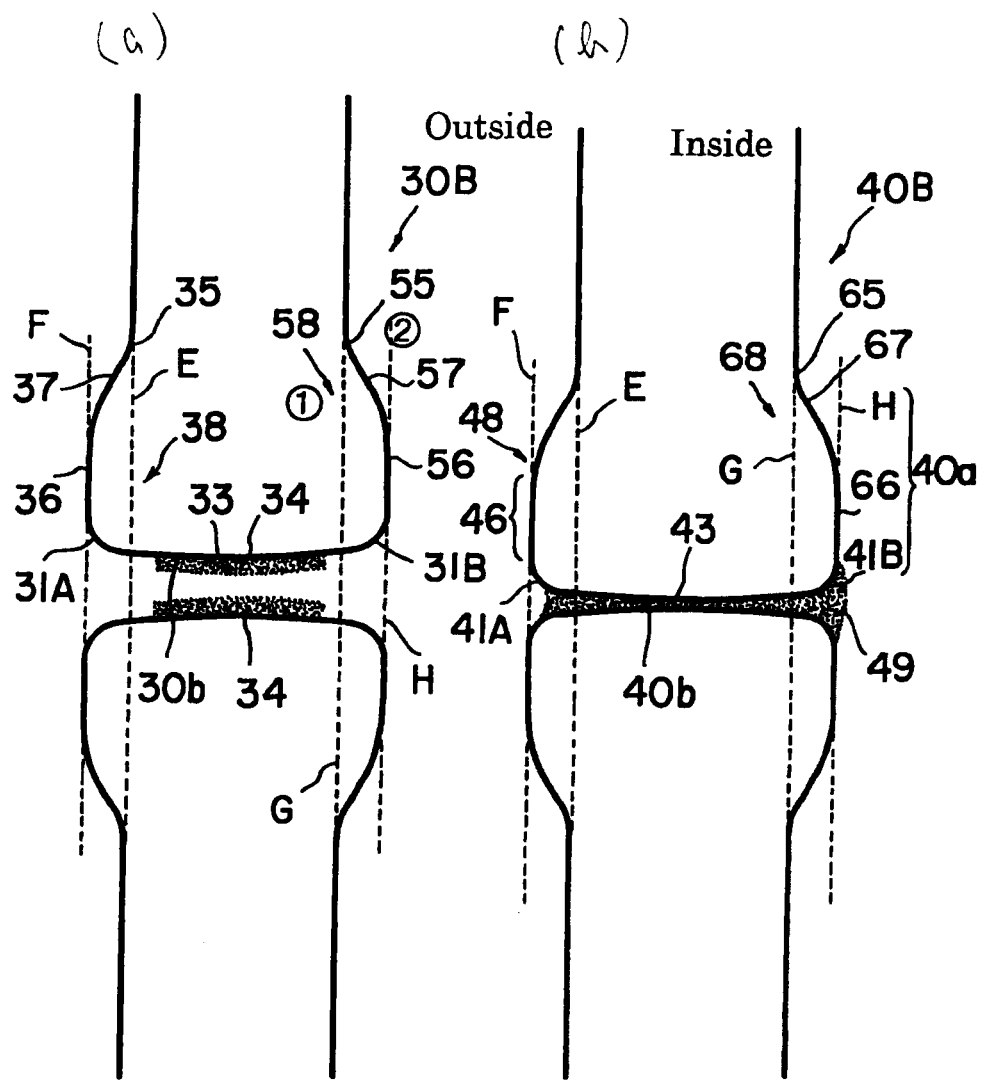
FIGS. 11(a) and (b) are schematic sectional views of a molded body 30B, in which (a) shows the state before joining, and (b) shows the state after joining.

When the joining slurry 34 is supplied onto each joint surface as shown in FIGS. 9 to 11, the slurry is preferably provided between a virtual line E showing the outer circumferential surface position in the expansion start point 35 of the expansion part of each joined body and a virtual line G showing the inner circumferential surface position thereof.

When the space between the virtual line F and the virtual line G of the outside expansion part is 100%, the width of the joining slurry is set preferably to 30 to 150%, further preferably to 50 to 90% (refer to FIG. 9).

When the space between the virtual line F of the outside expansion part and the virtual line H of the inside recessed part 39 is 100%, the width of the joining slurry is set preferably to 30 to 150%, further preferably to 50 to 90% (refer to FIG. 10). In FIG. 10, the space between E and F (or the protruding height of the outside expansion part) is preferably larger than the space between G and H (or the depth of the inside recessed part 39).

When the space between the virtual line F of the outside expansion part and the virtual line H of the inside expansion part is 100%, the width of the joining slurry is set preferably to 30 to 100%, further preferably to 50 to 90% (refer to FIG. 11).

Figure 12:
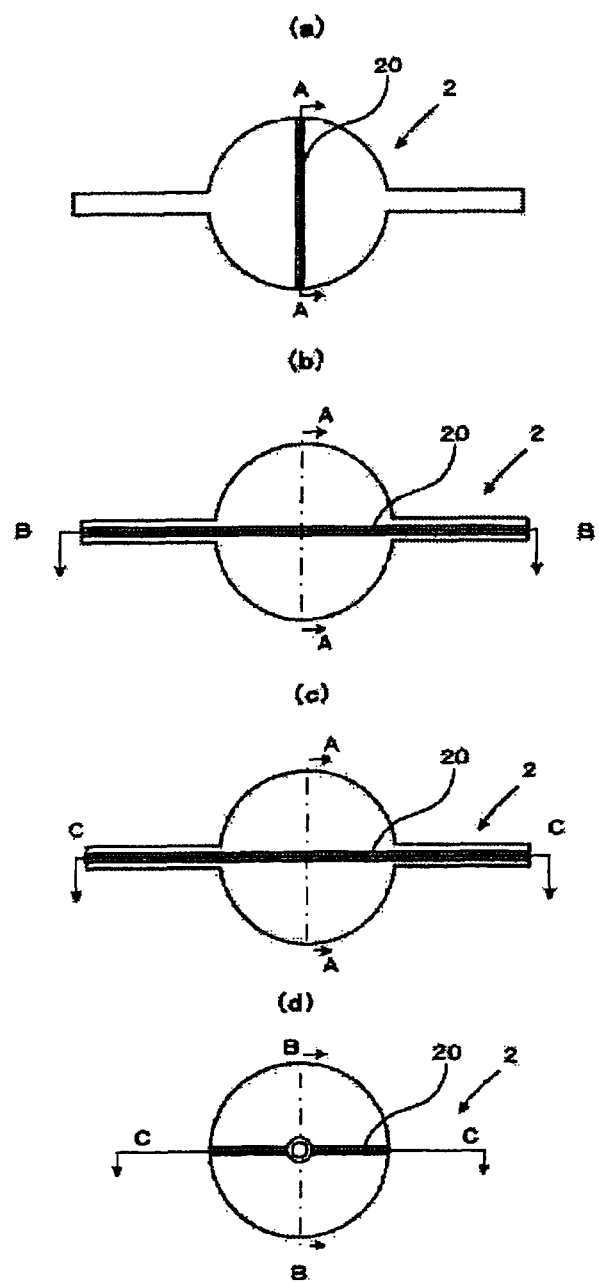
FIGS. 12(a), (b), (c) and (d) are front views showing the shape of each part of a sintered body 50.

The shape of each molded body is not particularly limited. FIGS. 12 to 14 show various shapes of molded bodies. In FIG. 12(a), a reaction tube-like sintered body 50 is axially halved at a hollow part vicinity 51 of the sintered body 50 as shown by arrow A. In FIG. 12(b), the sintered body 50 is halved at 51 along an axial line B. In FIGS. 12(c) and (d), the sintered body 50 is halved at 51 along another longitudinal axial line C orthogonal to the axial line B. These pieces are combined together, whereby the sintered body 50 can be divided to two or three or more molded bodies.

As shown in FIG. 13, a reaction tube or passage tube 52 can be divided to two halves 53 in the passage direction. The tube 52 can be divided to two halves 53 along the passage direction. Molded bodies of various split shapes which can be used for obtaining a light emitting tube are shown in FIG. 14.

After joining the first and second inorganic powder molded bodies together, the joined body can be degreased or calcined. The degreasing process or calcination process is preferably carried out in a reducing atmosphere. The sintering process is preferably carried out also in the reducing atmosphere. The reducing atmosphere typically consists of hydrogen, and may contain inert gas.

The sintering temperature is determined depending on the material. In a preferred embodiment, the highest temperature in sintering can be set to 1750° C. or lower.

The lower limit of the sintering temperature is not particularly determined and selected depending on the material. For example, it is set preferably to 1350° C. or higher, further preferably to 1450° C. or higher. Humidification may be properly performed according to the color tone of the sintered body (e.g., blackening) (dew point: −10 to +10° C.).

In a preferred embodiment, the molded body can be degreased at a temperature between 1000 and 1200° C. and successively sintered. The degreasing is preferably carried out in the atmosphere. At this time, atmospheric air or oxygen can be properly supplied so that the inside of a furnace is not laid in oxygen-deficient state.

Since the organic component in a gel-cast molded body is hardly decomposed, compared with the organic component in a molded body obtained by general molding (binder for powder press or extrusion work) process, this degreasing process is effective for promotion of the decomposition of organic component and also effective for suppression of the blackening of sintered body. The degreasing time is not limited, but is set preferably to 30 hours or more, further preferably to 60 hours or more.

Depending on the color tone of sintered body (e.g., blackening), atmospheric annealing can be performed at 1000 to 1500° C. In this case, atmospheric air or oxygen can be supplied so that the inside of a furnace is not laid in oxygen-deficient state.

A molding mold and a bonding tool to be used are preferably made of a resin such as silicone or high-density polyethylene as well as aluminum alloy and iron-based material. For improving releasability or wear resistance, the mold surface can be coated with Teflon (trademark) (trade name) or DLC (Diamond-Like Carbon).

EXAMPLES

Example 1

Figure 2:
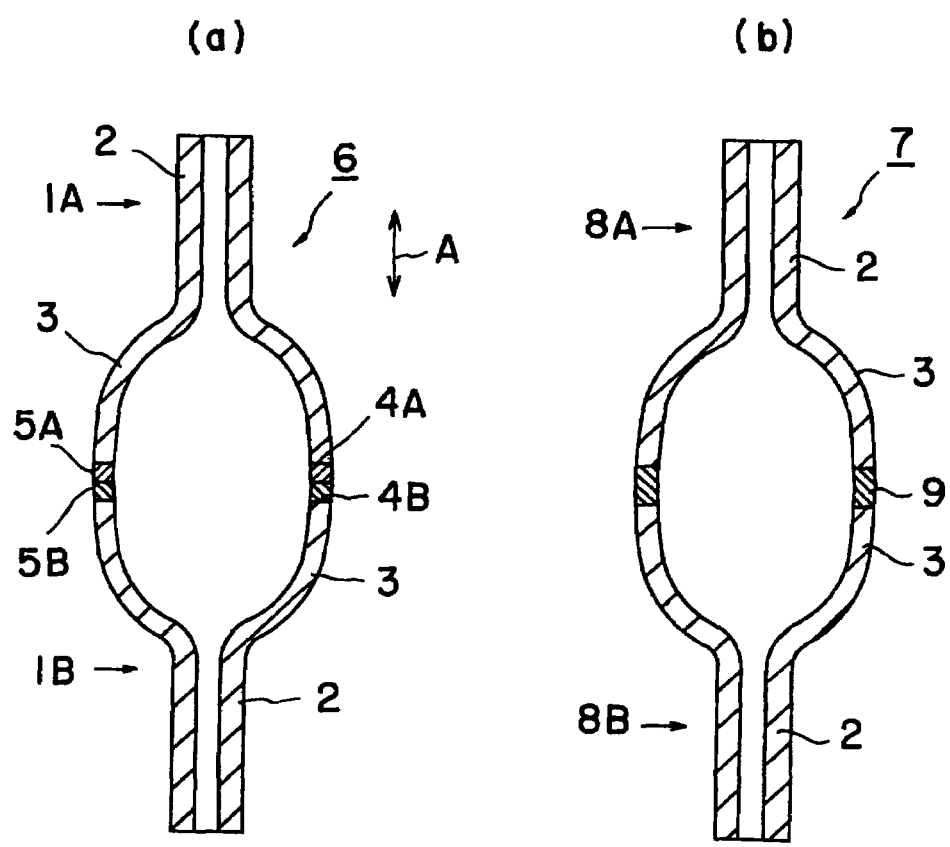
FIGS. 2(a) and (b) are sectional views of a joined body 6 of the molded bodies 1A and 1B, and a sintered body 7 obtained by sintering the molded body 6 of FIG. 2(a), respectively.

According to the method described in reference to FIGS. 1 and 2, an integrated sintered body (light emitting tube) 7 was produced.

Molding slurry for each molded body 1A, 1B was prepared as follows. Namely, the slurry was prepared by mixing 100 parts by weight of alumina powder (trade name: ALUMINA AES-11C, SUMITOMO CHEMICAL) and 0.025 parts by weight of magnesia as raw material powder, 24 parts by weight of dimethyl malonate as dispersion medium, 2 parts by weight of a gelling agent (trade name: BAYHYDUR 3100, SUMITOMO BAYER URETHANE), 1 part by weight of a dispersant (trade name; MALIALIM AKM 0531, NOF CORP.) and 0.2 part by weight of triethylamine as catalyst.

This slurry was casted into an aluminum alloy-made mold at room temperature and allowed to stand at room temperature for 1 hour. It was further allowed to stand at 40° C. for 30 minutes to progress solidification, and then released from the mold. Further, it is allowed to stand at room temperature and at 90° C. each for two hours, whereby powder molded bodies 1A and 1B having an axially halved shape of metal halide lamp light emitting tube were obtained.

Prior to joining, joint surfaces 4A and 4B which correspond to the body part center were polished with a diamond abrasive plate and finished into butt joint surfaces. The surface roughness of each joint surface was about 40 microns. The above-mentioned molding slurry was used also as joining slurry 5A, 5B. The joining slurry was applied to each of the joint surfaces in a thickness of about 300 microns. The respective molded bodies 1A and 1B are allowed to abut on each other and joined together with application of a load of about 50 g for 10 seconds. The sectional area of the joint part was 0.61 $cm^2$, which corresponds to 0.082 $kgf/cm^2$ in terms of stress. The penetration depth of the slurry to powder molded body which was separately measured was about 200 microns. Thereafter, the joined body was allowed to stand at 110° C. in the atmosphere for 2 hours to solidify the joining slurry.

The resulting joined body 6 was compacted and made translucent by calcinating at 1100° C. in the atmosphere and then sintering at 1800° C. in an atmosphere of hydrogen: nitrogen=3:1, whereby a light emitting tube 7 having a total length of 50 mm, a body part outer diameter of 14 mm, and a capillary length of 17 mm was obtained. As a result of evaluation of thermal impact resistance by water quenching method, this light emitting tube was in the same level as a light emitting tube of the same shape formed by single-body molding method, without cracking even at 150° C. After the evaluation of thermal impact resistance, leak amount in body part was measured using a He leak measuring machine, and an acceptable value of $1 \times 10^{-8}$ atm·cc/sec or less was obtained.

Figure 3:
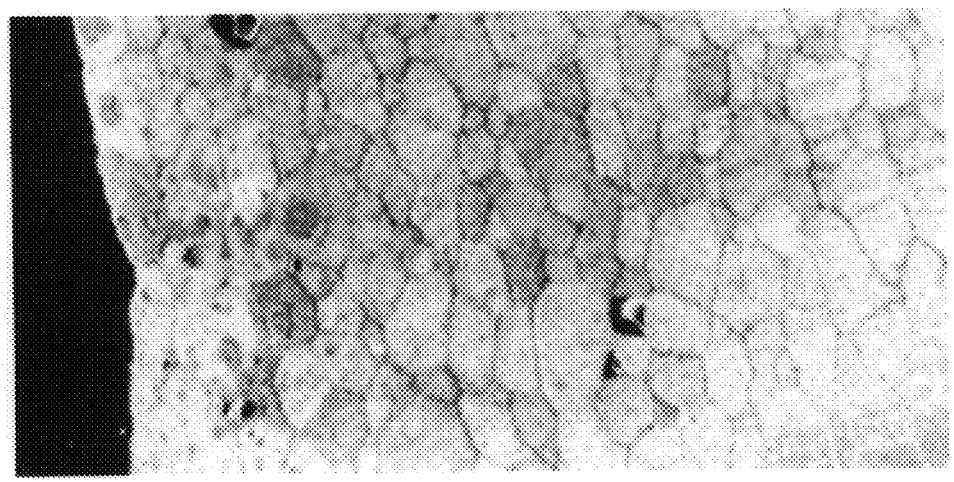
FIG. 3 is a microphotographic image showing the ceramics structure of a joint interface in a sintered body.

FIG. 3 is a photographic image showing the vicinity of a joint interface in which the upper half is a joining part 9 and the lower half is a molded body part (half), and no microstructural interface is observed between the both.

Example 2

According to the method described in reference to FIGS. 1 and 2, an integrated sintered body (light emitting tube) 7 was produced.

Molding slurry for each molded body 1A, 1B was prepared as follows. Namely, the slurry was prepared by mixing 100 parts by weight of alumina powder (trade name: ALUMINA AKP-20, SUMITOMO CHEMICAL) and 0.025 parts by weight of magnesia as raw material powder, 27 parts by weight of CHEM REZ (trade name, HODOGAYA ASHLAND) and 0.3 parts by weight of ethylene glycol as dispersion medium, 4 parts by weight of SBU ISOCYANATE 0775 (trade name, SUMITOMO BAYER URETHANE) as gelling agent, 3 parts by weight of MALIALIM AKM 0531 (trade name, NOF CORP.) as dispersant, and 0.1 part by weight of a catalyst (trade name: KAORISER No. 25, KAO).

This slurry was casted into a mold which has the same shape as in Example 1, but uses silicone resin as the material at room temperature, and allowed to stand at room temperature for 1 hour. It was further allowed to stand at 40° C. for 30 minutes to progress solidification, and then released from the mold. It was further allowed to stand at room temperature and at 90° C. each for two hours, whereby powder molded bodies 1A and 1B having an axially halved shape of a metal halide lamp light emitting tube were obtained.

Prior to joining, central joint surfaces 4A and 4B were polished with a diamond abrasive plate and finished into butt joint surfaces. The centerline average surface roughness of each joint surface was about 50 microns. The above-mentioned molding slurry was used also as joining slurry. The joining slurry was applied to each of the joint surfaces in a thickness of about 200 microns. The respective molded bodies were allowed to abut on each other and joined without application of a load other than the dead weight of the molded bodies. The penetration depth to powder molded body which was separately measured was about 100 microns. Thereafter, the joined body was allowed to stand at 110° C. in the atmosphere for 2 hours to solidify the joining slurry.

The resulting joined body 6 was compacted and made translucent by calcinating at 1100° C. in the atmosphere and then sintering at 1800° C. in an atmosphere of hydrogen:nitrogen=3:1, whereby a light emitting tube 7 having a total length of 50 mm, a body part outer diameter of 14 mm and a capillary length of 17 mm was obtained. As a result of evaluation of thermal impact resistance by water quenching method, this light emitting tube was in the same level as a light emitting tube of the same shape formed by one-body molding method, without cracking even at 150° C. After the evaluation of thermal impact resistance, leak amount in body part was measured using a He leak measuring machine, and an acceptable value of $1 \times 10^{-8}$ atm·cc/sec or less was obtained.

Example 3

Molded bodies 1A and 1B were obtained by the same method as in Example 2. Joining slurry used herein has the same composition as the molding slurry except it is free from the above-mentioned gelling agent.

Prior to joining, similarly to Example 2, joint surfaces 4A and 4B that correspond to the body part center were polished with a diamond abrasive plate and finished into butt joint surfaces. The centerline average surface roughness of each joint surface 4A, 4B was about 50 microns. The joining slurry 5A, 5B was applied to each joint surface in a thickness of about 100 microns. The molded bodies were mutually allowed to abut on each other and joined without application of a load other than the dead weight of the molded bodies. The penetration depth to powder molded body which was separately measured was about 80 microns. Thereafter, the joined body was allowed to stand at 110° C. in the atmosphere for 2 hours to solidify the joining slurry.

The resulting joined body 6 was compacted and made translucent by calcinating at 1100° C. in the atmosphere and then sintering at 1800° C. in an atmosphere of hydrogen:nitrogen=3:1, whereby a light emitting tube 7 having a total length of 50 mm, a body part outer diameter of 14 mm and a capillary length of 17 mm was obtained. As a result of evaluation of thermal impact resistance by water quenching method, this light emitting tube was in the same level as a light emitting tube of the same shape formed by one-body molding method, without cracking even at 150° C. After the evaluation of thermal impact resistance, leak amount in body part was measured using a He leak measuring machine, and an acceptable value of $1 \times 10^{-8}$ atm cc/sec was obtained.

Example 4

Figure 4:
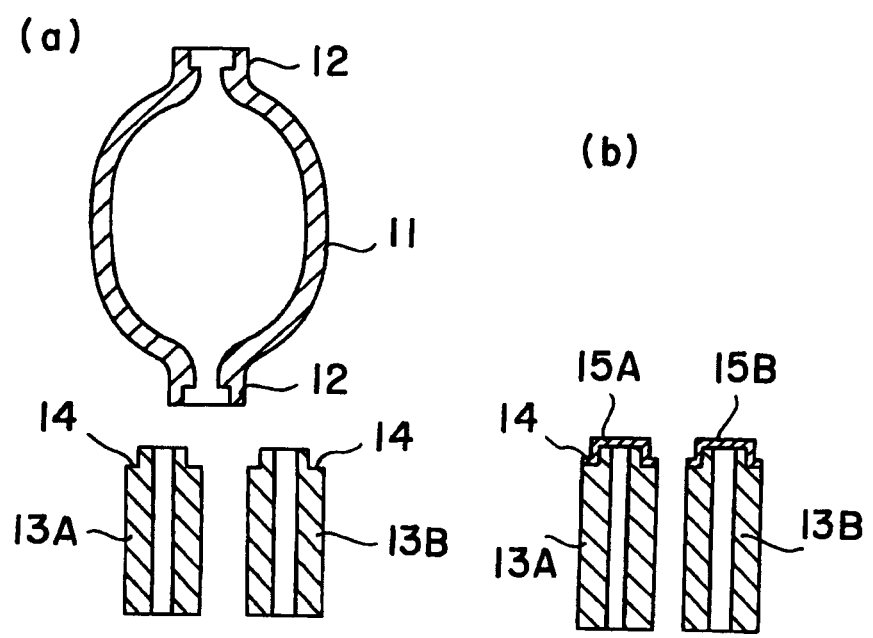
FIGS. 4(a) and (b) are sectional views of first inorganic powder molded bodies 13A and 13B and a second inorganic powder molded body 10, in which (b) shows the state where slurries 15A and 15B are applied to respective joint surfaces 14 of the molded bodies 13A and 13B.
Figure 5:
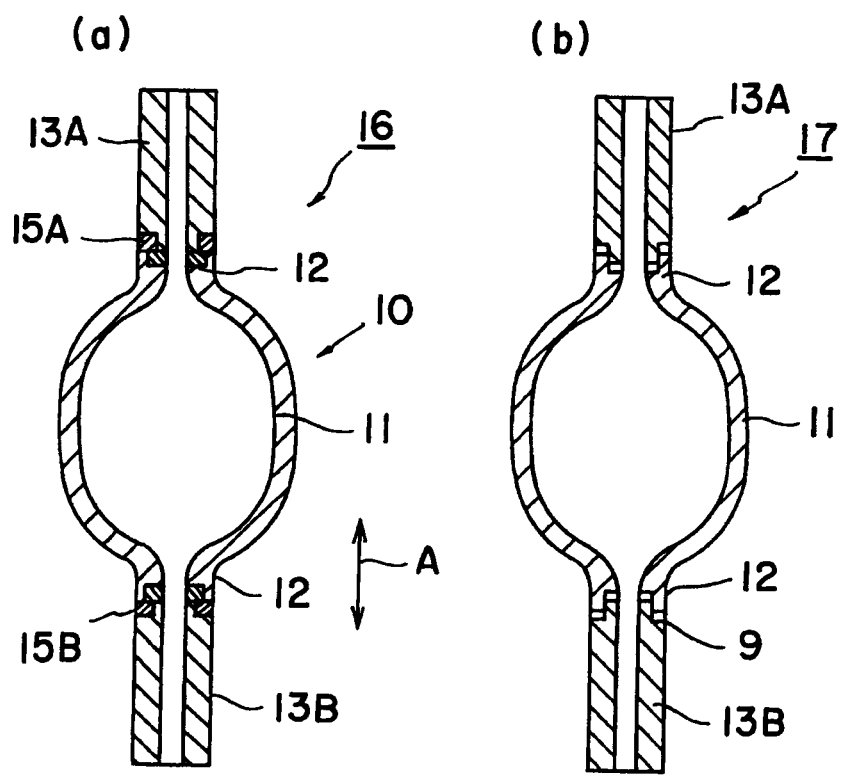
FIGS. 5(a) and (b) are sectional views of a joined body 16 of the molded body 11 and the molded bodies 13A and 13B, and a sintered body 17 obtained by sintering the molded body 16 of FIG. 5(a), respectively.

According to the method described in reference to FIGS. 4 and 5, a light emitting tube 17 of three bodies shown in FIG. 5(b) was produced, using the same molding slurry, joining slurry and production method as in Example 2. The load in joining was set to 0.075 kgf/cm² in the tube axial direction.

A joined body 16 was compacted and made translucent by calcinating at 1100° C. in the atmosphere and then sintering at 1800° C. in an atmosphere of hydrogen:nitrogen=3:1, whereby a light emitting tube 17 having a total length of 70 mm, a body part outer diameter of 20 mm and a capillary length of 20 mm was obtained. As a result of evaluation of thermal impact resistance by water quenching method, this light emitting tube was in the same level as a light emitting tube of the same shape formed by one-body molding method, without cracking even at 150° C. After the evaluation of thermal impact resistance, leak amount in body part was measured using a He leak measuring machine, and an acceptable value of $1 \times 10^{-8}$ atm·cc/sec or less was obtained.

Comparative Example 1

Molded bodies 1A and 1B were obtained by the same method as in Example 2, except changing the joining slurry in Example 2 to the organic dispersant only (27 parts by weight of "CHEM REZ 6080" (trade name, HODOGAYA ASHLAND) and 0.3 parts by weight of ethylene glycol). After drying, separation of two molded bodies was caused at the joint interface.

Comparative Example 2

Molded bodies and a sintered body were produced in the same manner as in Example 4. A body part 11 was molded by the same method as in Example 4, while capillary tube parts 13A and 13B were obtained not by chemical reaction solidification but by dry back press process (combination of mechanical press and mechanical finishing). Prior to the molding of the capillary tube parts 13A and 13B, granulating powder containing 3 wt % of PVA (polyvinyl alcohol) was prepared, and the granulating powder was compression-molded.

Joining was tried in the same manner as Example 4 using the slurry used for molding of the body part as the joining slurry. However, the molded body 11 was separated from the molded bodies 13A and 13B after drying. No penetration of slurry to the capillary tube parts 13A and 13B was observed.

Example 5

In this example, according to the method described in reference to FIGS. 8 to 11, a light emitting tube was produced as a sintered body. The shapes of the light emitting tube and halves thereof are shown in FIG. 12(a). Molded bodies 30, 30A and 30B constituting sintered bodies 40, 40A and 40B were produced as follows. Namely, slurry was prepared by mixing 100 parts by weight of alumina powder (trade name: ALUMINA AES-11C, SUMITOMO CHEMICAL) and 0.025 parts by weight of magnesia as raw material powder, 24 parts by weight of dimethyl malonate as dispersion medium, 2 parts by weight of BAYHYDUR 3100 (trade name, SUMITOMO BAYER URETHANE) as gelling agent, 1 part by weight of MALIALIM AKM 0351 (trade name, NOF CORP.) as dispersant, and 0.2 parts by weight of triethylamine as catalyst. This slurry was casted into an aluminum alloy-made mold at room temperature and allowed to stand at room temperature for 1 hour. It was further allowed to stand at 40° C. for 30 minutes to progress solidification, and then released from the mold. It was further allowed to stand at room temperature and at 90° C. each for two hours, whereby powder molded bodies of an axially halved shape of a metal halide lamp light emitting tube were obtained. Chamfering of joining end surface was carried out in the range of R of 0.05 to 0.15 mm.

The joining slurry was prepared as follows. Namely, the joining slurry was prepared by mixing, as raw material powder, alumina powder (100 parts by weight) and magnesia powder (0.025 parts by weight), acetone (100 parts by weight), butyl Carbitol (30 parts by weight) and polyvinyl acetal resin (BM-2, SEKISUI CHEMICAL) (8.5 parts by weight).

As a screen printing plate, a ring-shape pattern (inside diameter 12.8 mm, outside diameter 13.7 mm) with emulsion thickness 100 μm and #290 mesh was used. A molded body was fixed to a screen printer stage so that the screen printing plate is parallel to the joint surface (inside diameter 12.5 mm, outside diameter 14.0 mm) of the molded body, and positioned with the screen printing plate. The prepared joining slurry was supplied onto the joint surface of the molded body by the screen printer using the screen printing plate.

To measure the thickness of the joining slurry supplied, the joining slurry was dried. The thickness of the dried joining slurry layer was 100±20 μm, which shows that the joining slurry was supplied in a uniform thickness. Each parameter is shown in Tables 1 and 2. The sectional shapes of protruding parts are rectangular in Examples E and F, and the same as 33 of FIG. 8 in Examples G and H.

The halves were contacted with each other at the joining faces and a load of 0.05 to 0.2 kgf/cm$^2$ was applied for 1 to 10 minutes in a direction perpendicular to the joining face to perform the joining process. Thereafter, the halves were held in atmosphere at 100° C. for two hours to solidify the joining paste.

TABLE 1

|  |  |  | Ex. A | Ex. B | Ex. C | Ex. D | Ex. E |
|---|---|---|---|---|---|---|---|
| (b) Width of expansion part | Outside | μm | 300 | 200 | 30 | 200 | 300 |
|  | Inside | μm | 0 | 0 | 0 | 200 | 0 |
| (a) Width of molded body |  | μm | 1100 | 1080 | 600 | 1080 | 1100 |
| (e) Length of expansion part | Outside | μm | 1500 | 800 | 850 | 800 | 1500 |
|  | Inside | μm | 0 | 0 | 0 | 0 | 0 |
| (d) Length of constant-width part | Outside | μm | 450 | 280 | 100 | 280 | 450 |
|  | Inside | μm | 0 | 0 | 0 | 0 | 0 |
| (c) Height of protruding part |  |  | 0 | 0 | 0 | 0 | 100 |
| Sectional area ratio of joint surface/joined body |  |  | 1.3 | 1.2 | 1.1 | 1.2 | 1.3 |
| b/a | Outside |  | 0.27 | 0.19 | 0.05 | 0.19 | 0.27 |
|  | Inside |  | 0.00 | 0.00 | 0.00 | 0.00 | 0.00 |
| e/a | Outside |  | 1.36 | 0.74 | 1.42 | 0.74 | 1.36 |
|  | Inside |  | 0.00 | 0.00 | 0.00 | 0.00 | 0.00 |
| d/a | Outside |  | 0.41 | 0.26 | 0.17 | 0.26 | 0.41 |
|  | Inside |  | 0.00 | 0.00 | 0.00 | 0.00 | 0.00 |
| c/a |  |  | 0.00 | 0.00 | 0.00 | 0.00 | 0.09 |

TABLE 2

|  |  |  | Ex. F | Ex. G | Ex. H | Ex. I | Ex. J |
|---|---|---|---|---|---|---|---|
| (b) Width of expansion part | Outside | μm | 200 | 30 | 200 | 300 | 200 |
|  | Inside | μm | 0 | 0 | 200 | −50 | −20 |
| (a) Width of molded body |  | μm | 1080 | 600 | 1080 | 1100 | 1080 |
| (e) Length of expansion part | Outside | μm | 800 | 850 | 800 | 1500 | 800 |
|  | Inside | μm | 0 | 0 | 0 | 300 | 300 |
| (d) Length of constant-width part | Outside | μm | 280 | 100 | 280 | 450 | 280 |
|  | Inside | μm | 0 | 0 | 0 | 300 | 300 |
| (c) Height of protruding part |  |  | 100 | 100 | 100 | 0 | 0 |
| Sectional area ratio of joint surface/joined body |  |  | 1.2 | 1.1 | 1.2 | 1.2 | 1.2 |
| b/a | Outside |  | 0.19 | 0.05 | 0.19 | 0.27 | 0.19 |
|  | Inside |  | 0.00 | 0.00 | 0.19 | −0.05 | −0.02 |
| e/a | Outside |  | 0.74 | 1.42 | 0.74 | 1.36 | 0.74 |
|  | Inside |  | 0.00 | 0.00 | 0.00 | 0.27 | 0.28 |
| d/a | Outside |  | 0.26 | 0.17 | 0.26 | 0.41 | 0.26 |
|  | Inside |  | 0.00 | 0.00 | 0.00 | 0.27 | 0.28 |
| c/a |  |  | 0.09 | 0.17 | 0.09 | 0.00 | 0.00 |

The produced joined body was compacted and made translucent by calcinating at 1100° C. in the atmosphere and then sintering at 1800° C. in an atmosphere of hydrogen:nitrogen=3:1. As the result, sintered bodies (light emitting tubes) 40, 40A and 40B having a body outer diameter of 11 mm and a capillary length of 17 mm could be obtained from the joined bodies. In the resulting sintered bodies, no crack or deformation was observed. As a result of evaluation of thermal impact resistance by water quenching method, each sintered body was in the same level as a light emitting tube of the same shape formed by one-body molding method, without cracking even at 150° C. Further, after the evaluation of thermal impact resistance, leak amount in body part was measured for the sintered bodies A and B using a He leak measuring machine, and an acceptable value of $1\times10^{-8}$ atm·cc/sec or less was obtained in each case.

Figure 15:
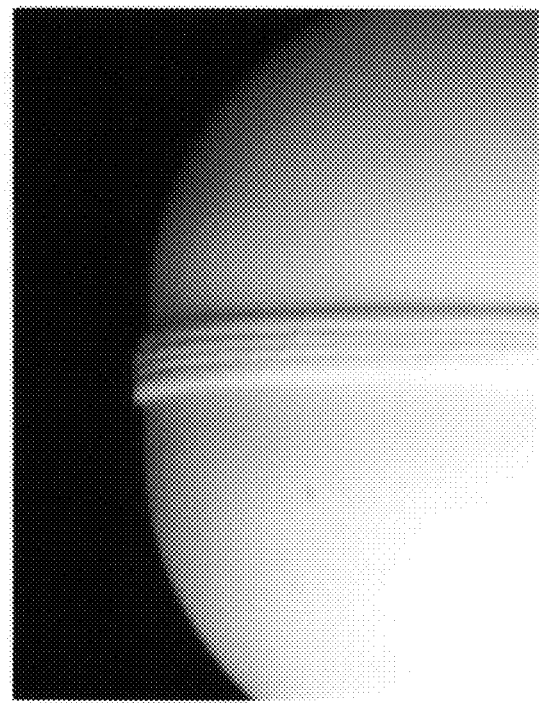
FIG. 15 is a photographic image of a molded body before joining.
Figure 16:
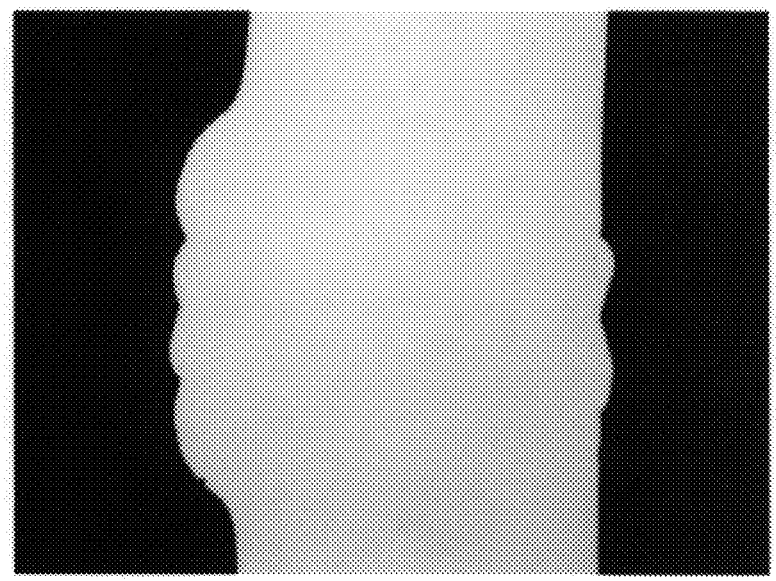
FIG. 16 is a photographic image of a polished sectional surface of a joint part after joining.

FIG. 15 is a photographic image showing the appearance before joining, and FIG. 16 is a photographic image showing a polished sectional surface of a joint part after joining. For the sintered body of each example, the joined state was observed by microphotographic observation of joint section. As a result, no pore was observed in the joint layer in each case. Further, the crystal grain size of the joint layer was evaluated by surface grain size. No abnormal grain growth was consequently observed with a grain size of about 10 to 80 μm and an average size of 20 to 40 μm.

The invention claimed is:

1. A method for producing a sintered body, the method comprising the steps of:
    obtaining a first inorganic powder molded body having a hollow portion and a second inorganic powder molded body having a hollow portion, each of the molded bodies comprising an inorganic powder, an organic dispersion medium having a reactive functional group and a gelling agent and being solidified by chemical reaction of the organic dispersion medium and the gelling agent;
    applying a slurry comprising a powder component and an organic dispersion medium to a first joint surface of the first inorganic powder molded body;
    bringing the first joint surface of the first inorganic powder molded body into contact with a second joint surface of the second inorganic powder molded body through the slurry interposed between the first and second inorganic powder molded bodies to obtain an integrated joined body having an inner space defined by the respective hollow portions of the molded bodies; and
    sintering the integrated joined body to obtain a sintered body;
    wherein the first joint surface extends between terminal portions corresponding to end edges of respective corner portions of the first inorganic powder molded body;
    wherein an entirety of the first joint surface defines an outwardly protruding part having a continuous curvature shape that is unbroken by flat portions in a cross-sectional view;
    wherein the outwardly protruding part protrudes outwardly with respect to a virtual plane defined between the terminal portions of the first joint surface; and
    wherein an entirety of the second joint surface likewise defines an outwardly protruding part.

2. The method of claim 1, wherein the virtual plane from which the first joint surface of the first inorganic powder molded body outwardly protrudes is substantially perpendicular to a longitudinal central axis of the first inorganic powder molded body.

3. The method of claim 1, wherein a load is applied in a direction perpendicular to the respective joint surfaces to join the molded bodies while the first inorganic powder molded body is brought into contact with the second inorganic powder molded body.

4. The method of claim 1, further comprising the step of penetrating the slurry into the first inorganic power molded body after the slurry is applied to the first joint surface and before the joining step.

5. The method of claim 1, further comprising the step of applying the slurry to the second joint surface of the second inorganic powder molded body.

6. The method of claim 1, wherein the organic dispersion medium of the slurry comprises a reactive functional group, and wherein the slurry further comprises a gelling agent.

7. The method of claim 1, wherein the first inorganic powder molded body comprises a slurry of the same kind as the slurry for joining.

8. The method of claim 1, wherein the first inorganic powder molded body comprises a joining end and an expansion part provided on at least the outside of the joining end.

9. The method of claim 8, wherein the second inorganic powder molded body comprises a joining end and an expansion part provided on at least the outside of the joining end.

10. The method of claim 9, wherein a width "a" is defined as a width of the second inorganic powder molded body at a terminal portion of the joining end part; and
    wherein "b" is defined as a difference measured between a maximum width of the joining end part of the molded body and "a," so that a ratio "b/a," which represents a numerical value defining a protrusion width of the expansion part, is in a range of 0.05 to 0.4.

11. The method of claim 10, wherein "e" represents a length of the expansion parts of the molded body, and wherein a ratio "e/a," which represents an index of slenderness of the expansion part, is in a range of 0.2 to 2.

12. The method of claim 9, wherein a width "a" is defined as a width of the second inorganic powder molded body at a terminal portion of the respective joining end parts, wherein "c" represents a height of the outwardly protruding part, and wherein a ratio "c/a" is in a range of 0.01 to 0.5.

13. The method of claim 8, wherein a recess is provided in the inside of a joining end of at least one of the first and second inorganic power molded bodies.

14. The method of claim 8, wherein a width "a" is defined as a width of the first inorganic powder molded body at a terminal portion of the joining end part; and
    wherein "b" is defined as a difference measured between a maximum width of the joining end part of the molded body and "a," so that a ratio "b/a," which represents a numerical value defining a protrusion width of the expansion part, is in a range of 0.05 to 0.4.

15. The method of claim 14, wherein "e" represents a length of the expansion part of the molded body, and wherein a ratio "e/a," which represents an index of slenderness of the expansion part, is in a range of 0.2 to 2.

16. The method of claim 8, wherein a width "a" is defined as a width of the first inorganic powder molded body at a terminal portion of the joining end part, wherein "c" represents a height of the outwardly protruding part of the first joint surface, and wherein a ratio "c/a" is in a range of 0.01 to 0.5.

17. The method of claim 1, wherein the first inorganic powder molded body comprises a chamfered part on edges of the respective corner portions of the first inorganic powder molded body proximate the terminal portions of the first joint surface.

18. The method of claim 1, wherein the slurry for joining comprises a non-self-curable slurry.

19. The method of claim 1, wherein the outwardly protruding part of the second joint surface has a continuous curvature shape that is unbroken by flat portions in a cross-sectional view.

* * * * *